US009410786B2

(12) United States Patent  
Chang et al.

(10) Patent No.: US 9,410,786 B2
(45) Date of Patent: Aug. 9, 2016

(54) COORDINATE MEASURING APPARATUS

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Chih-Kuang Chang, New Taipei (TW); Jun-Song Xu, Shenzhen (CN); Sheng-Qiang Shen, Shenzhen (CN); Jun-Hua Li, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 261 days.

(21) Appl. No.: 14/093,591

(22) Filed: Dec. 2, 2013

(65) Prior Publication Data
US 2015/0000147 A1 Jan. 1, 2015

(30) Foreign Application Priority Data

Jun. 28, 2013 (CN) .......................... 2013 1 0268370

(51) Int. Cl.
G01B 5/00 (2006.01)
G01B 5/008 (2006.01)

(52) U.S. Cl.
CPC .............. G01B 5/008 (2013.01); G01B 5/0009 (2013.01)

(58) Field of Classification Search
CPC ......... G01B 5/004; G01B 5/008; G01B 11/00
USPC ........................................................... 33/503
See application file for complete search history.

(56) References Cited

U.S. PATENT DOCUMENTS

| | | | | |
|---|---|---|---|---|
| 5,042,162 A * | 8/1991 | Helms | ................... | F16F 7/1005 33/503 |
| 6,158,136 A * | 12/2000 | Gotz | ...................... | G01B 3/008 33/503 |
| 7,627,957 B2 * | 12/2009 | Uhl | ....................... | G01B 21/047 33/503 |
| 7,779,553 B2 * | 8/2010 | Jordil | ..................... | G01B 21/04 33/558 |
| 2009/0013549 A1* | 1/2009 | Lutz | ..................... | B23Q 1/0054 33/503 |
| 2010/0132432 A1* | 6/2010 | Wallace | ............... | G01B 21/045 33/503 |
| 2012/0079731 A1* | 4/2012 | Ruck | ...................... | G01B 5/012 33/503 |
| 2012/0084989 A1* | 4/2012 | Pettersson | ........... | G01B 21/045 33/503 |
| 2014/0007441 A1* | 1/2014 | Pettersson | ........... | G01B 21/045 33/503 |
| 2014/0259715 A1* | 9/2014 | Engel | ..................... | G01B 5/008 33/503 |
| 2015/0000147 A1* | 1/2015 | Chang | .................. | G01B 5/0009 33/503 |
| 2015/0052770 A1* | 2/2015 | Noda | .................... | G01B 21/042 33/503 |
| 2015/0285616 A1* | 10/2015 | Jordil | .................... | G01B 21/047 33/503 |
| 2015/0300798 A1* | 10/2015 | Pettersson | .............. | G01B 5/008 33/503 |

* cited by examiner

Primary Examiner — Yaritza Guadalupe-McCall
(74) Attorney, Agent, or Firm — ScienBiziP, P.C.

(57) ABSTRACT

A coordinate measuring apparatus includes a base body, a delivery unit located on the base body, and a probing unit. The delivery unit includes a power assembly, a first lead screw assembly connected to the power assembly, and a second lead screw assembly connected to the first lead screw assembly and the probing unit. The power assembly is configured for driving the first lead screw assembly to move along a first direction. The first lead screw assembly is configured for driving the second lead screw assembly to move along a second direction. The second lead screw assembly is configured for driving the probing unit to move along a third direction.

20 Claims, 4 Drawing Sheets

COORDINATE MEASURING APPARATUS

BACKGROUND

1. Technical Field

The present disclosure relates to coordinate measuring apparatuses, and more particularly to a coordinate measuring apparatus having high precision.

2. Description of Related Art

Coordinate measuring apparatuses are used to accurately measure characteristics of three-dimensional objects. A coordinate measuring apparatus may include a power assembly, a plurality of air floatation bearings, and a probing unit. The power assembly with the plurality of air floatation bearings moves the probing unit towards a three-dimensional object to measure the three-dimensional object by lightly touching designated surfaces with the probing unit. However, guiding performance and bearing performance of the plurality of air floatation bearings can be poor, which affect accuracy of the coordinate measuring apparatus.

Therefore, there is room for improvement within the art.

BRIEF DESCRIPTION OF THE DRAWINGS

Many aspects of the present coordinate measuring apparatus can be better understood with reference to the following drawings. The components in the various drawings are not necessarily drawn to scale, the emphasis instead being placed upon clearly illustrating the principles of the present coordinate measuring apparatus.

DETAILED DESCRIPTION

Figure 1:
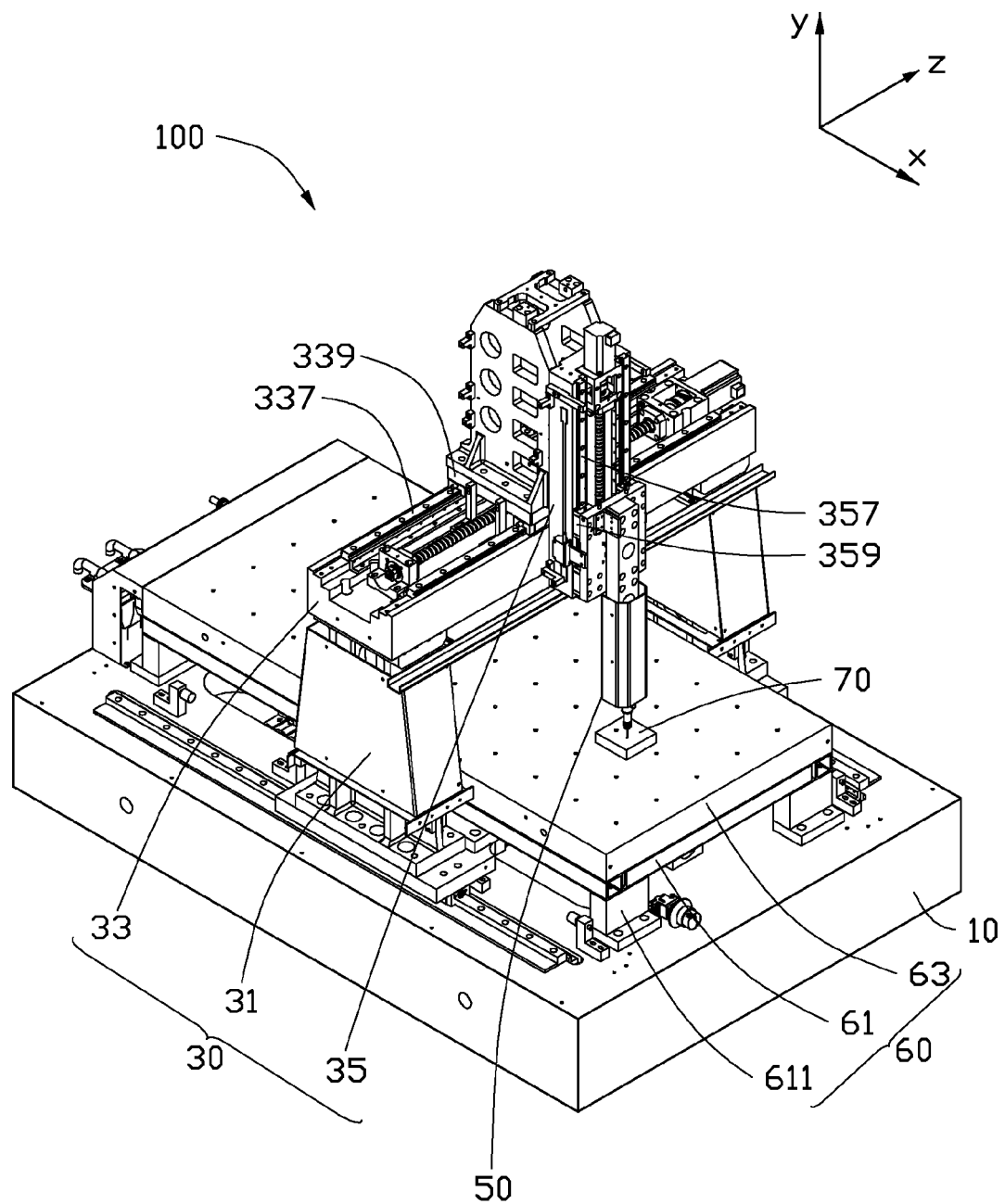
FIG. 1 is a schematic view of an embodiment of a coordinate measuring apparatus with a jig.
Figure 2:
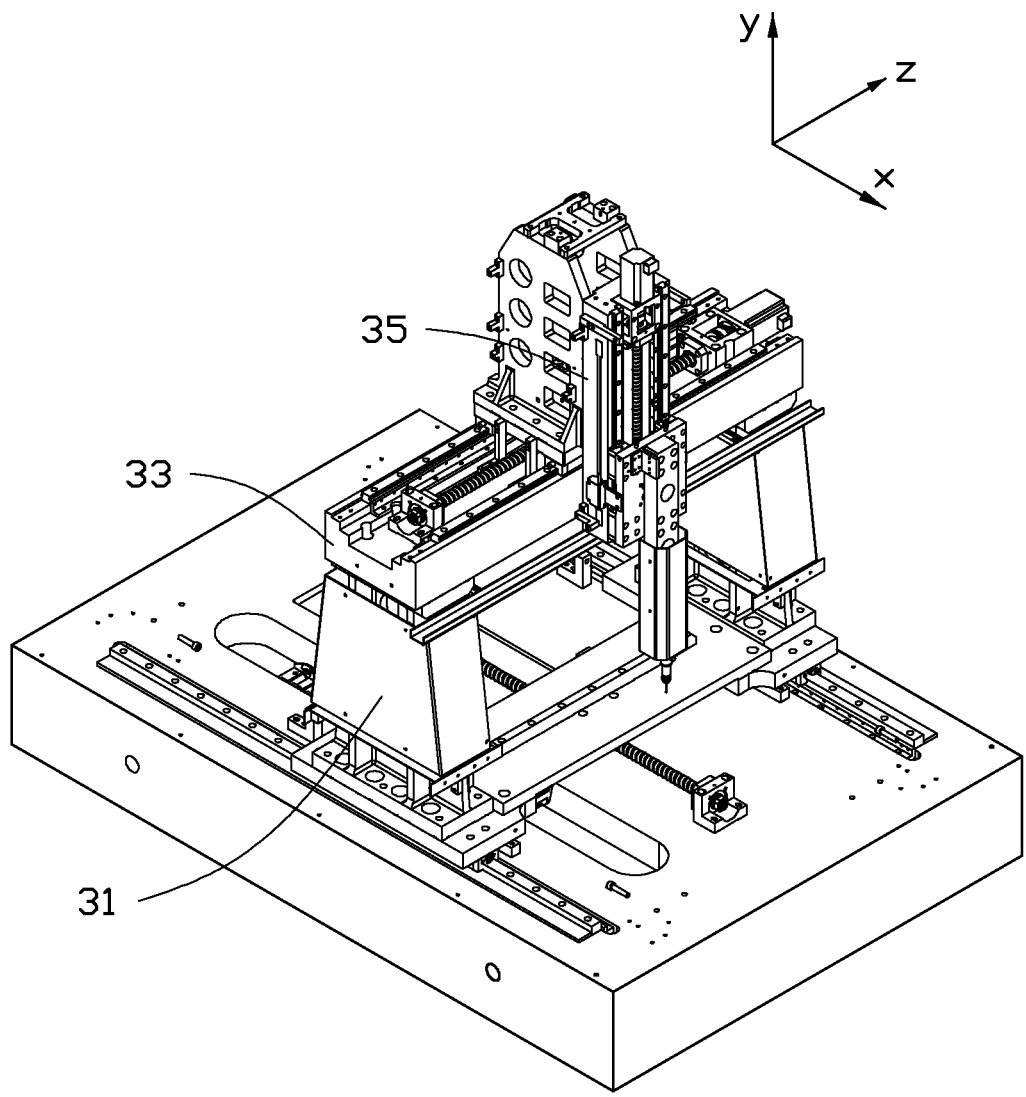
FIG. 2 is a schematic view of the coordinate measuring apparatus of FIG. 1 without the jig.

FIG. 1 and FIG. 2 show a coordinate measuring apparatus 100 for measuring size dimensions of an object 70. The coordinate measuring apparatus 100 includes a base body 10, a delivery unit 30, a probing unit 50, and a jig 60. The delivery unit 30 is located on the base body 10. The probing unit 50 and the jig 60 are connected to the delivery unit 30.

The delivery unit 30 includes a power assembly 31, a first lead screw assembly 33, and a second lead screw assembly 35. The first lead screw assembly 33 is connected to the power assembly 31. The second lead screw assembly 35 is connected substantially perpendicularly to the first lead screw assembly 33. An effective travel distance of the power assembly 31 is about 400 millimeters (mm) to about 600 mm. An effective travel distance of the first lead screw assembly 33 is about 200 mm to about 300 mm. An effective travel distance of the second lead screw assembly 35 is about 400 mm to about 600 mm.

Figure 3:
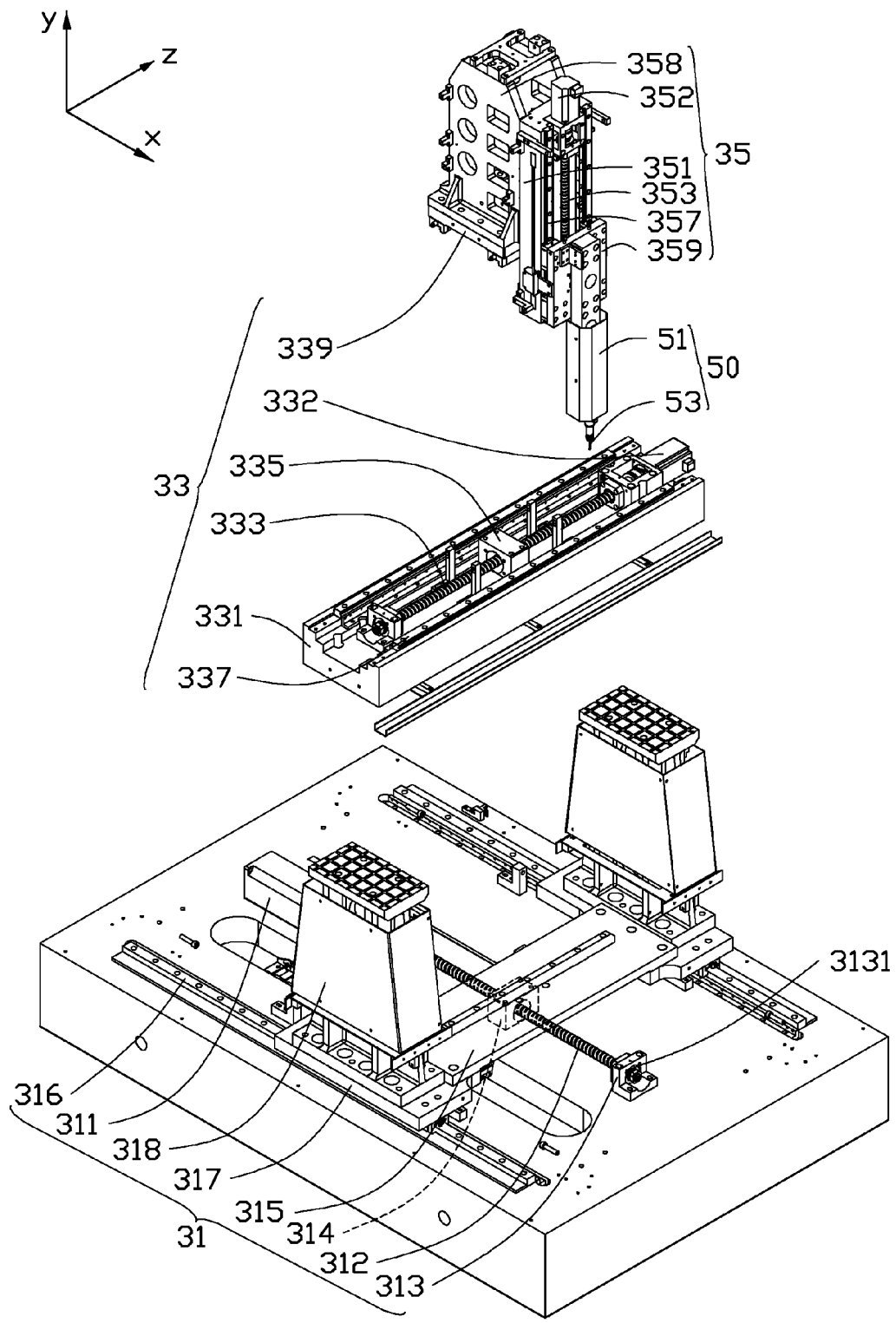
FIG. 3 is an exploded view of the coordinate measuring apparatus of FIG. 2.

Referring to FIG. 3, the power assembly 31 includes an electric motor 311, a threaded rod 312, a support block 313 for supporting the threaded rod 312, a sliding block 314, a connecting plate 315, at least one sliding rail 316, at least one sliding member 317, and at least one support member 318. The threaded rod 312 is connected to the electric motor 311. The sliding block 314 forms inner threads (not shown) to engage with threads of the threaded rod 312. The connecting plate 315 is connected to the sliding block 314. The sliding member 317 is slidably connected to the sliding rail 316. The support member 318 is connected to the sliding member 317. In this embodiment, the power assembly 31 includes two sliding rails 316, two sliding members 317, and two support members 318. The electric motor 311, the support block 313, and the two sliding rails 316 are located on the base body 10. The electric motor 311, the threaded rod 312, the support block 313, the sliding block 314, and the connecting plate 315 are located between the two sliding rails 316.

In this embodiment, the support block 313 is substantially L-shaped and defines a through hole 3131. A first end of the threaded rod 312 is connected to the electric motor 311, while a second end of the threaded rod 312 is rotatably received in the through hole 3131. When the electric motor 311 is powered on, the electric motor 311 drives the threaded rod 312 to rotate. The connecting plate 315 is connected between the two sliding members 317. The two support members 318 support the first lead screw assembly 33 thereon.

Figure 4:
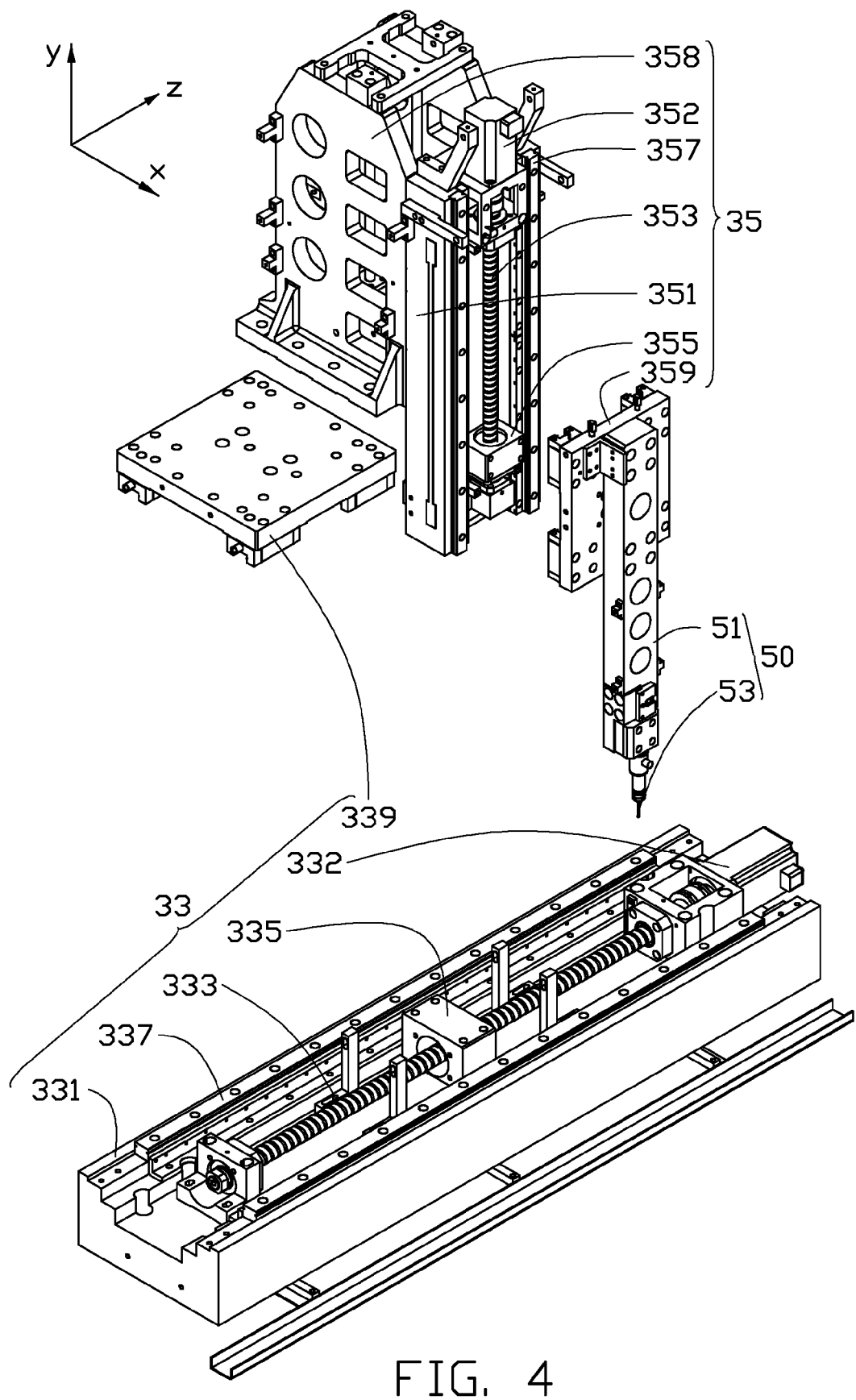
FIG. 4 is an exploded view of a first lead screw assembly, a second lead screw assembly, and a probing unit of the coordinate measuring apparatus of FIG. 3.

Referring to FIG. 4, the first lead screw assembly 33 includes a first main body 331, a first motor 332, a first lead screw 333, a first sliding member 335, two first rails 337, and a first connecting block 339. The first main body 331 is supported by the two support members 318. The first motor 332 is located on the first main body 331, and a first end of the first lead screw 333 is connected to the first motor 332. The first sliding member 335 forms inner threads (not shown) to engage with threads of the first lead screw 333. The two first rails 337 are located on a surface of the first main body 331. The first connecting block 339 is fixed on the first sliding member 335 and is slidably connected to the two first rails 337. The first motor 332 and the first lead screw 333 are located between the two first rails 337.

The second lead screw assembly 35 includes a second main body 351, a second motor 352, a second lead screw 353, a second sliding member 355, two second rails 357, a second connecting block 358, and a third connecting block 359. The second main body 351 is connected to the first connecting block 339 by the second connecting block 358. The second motor 352 is located on the second main body 351 and connected to a first end of the second lead screw 353. The second sliding member 355 forms threads (not shown) to engage with threads of the second lead screw 353. The second connecting block 358 is connected to a side of the second main body 351 away from the second lead screw 353. The two second rails 357 are located on a surface of the second main body 351. The second motor 352, the second lead screw 353, and the second sliding member 355 are located between the two first rails 337. The third connecting block 359 is slidably connected to the two first rails 337. A side of the third connecting block 359 away from the second lead screw 353 is connected to the probing unit 50.

The probing unit 50 includes a connecting portion 51 and a probe 53. A first end portion of the connecting portion 51 is connected to the third connecting block 359, while a second end portion of the connecting portion 51 is connected to the probe 53.

The jig 60 includes a first plate 61, a second plate 63 located on the first plate 61, and four holding members 611 supporting the first plate 61 thereon. The four holding members 611 are fixed on the base body 10 and protrude above the connecting plate 315. The first plate 61 is substantially parallel to the connecting plate 315. The object 70 is located on the second plate 63.

In assembly of the coordinate measuring apparatus 100, the electric motor 311, the support block 313, and the sliding rail 316 are fixed on the base body 10. The first end of the threaded rod 312 is connected to the electric motor 311, while the second end of the threaded rod 312 is rotatably received in the through hole 3131. The threaded rod 312 is received through the sliding block 314, and the sliding block 314 is fixed on the connecting plate 315. Two opposite ends of the connecting plate 315 are connected to the two sliding members 317, respectively. Each sliding member 317 is slidably connected to a corresponding sliding rail 316.

Each support member 318 is located on a corresponding sliding member 317. The first main body 331 of the first lead screw assembly 33 is secured on the two support members 318. The first motor 332 and the two first rails 337 are located on the first main body 331. The first lead screw 333 is connected to the first motor 332 and received through the first sliding member 335. The first connecting block 339 is slidably connected to the two first rails 337.

The second main body 351 and the first connecting block 339 are connected to the second connecting block 358. The second motor 352 and the two second rails 357 are located on the second main body 351. The second motor 352 is connected to the second lead screw 353, and the second lead screw 353 is received through the second sliding member 355. The third connecting block 359 is slidably connected to the two first rails 337. The probe 53 of the probing unit 50 is connected to the third connecting block 359 by the connecting portion 51. The four holding members 611 are fixed on the base body 10 and support the jig 60.

Referring to FIGS. 1-3, a cartesian-coordinate system is defined. A direction along the X-axis is defined as a first direction, a direction along the Z-axis is defined as a second direction, and a direction along the Y-axis is defined as a third direction.

In use, the object 70 is located on the second plate 63 of the jig 60. The electric motor 311 is powered on, the electric motor 311 drives the threaded rod 312 to rotate, thereby moving the sliding block 314 and everything connected to the sliding block 314 along the first direction. The first motor 332 drives the first lead screw 333 to rotate, thereby moving the first sliding member 335 and the first connecting block 339 to move along the second direction. The second motor 352 drives the second lead screw 353 to rotate, thereby moving the second sliding member 355, the third connecting block 359 and the probing unit 50 to move along the third direction. The probing unit 50 is moved to a surface of the object 70 to measure the object 70. Measurement parameters include shape, size, and surface angles of the object 70.

The power assembly 31, the first lead screw assembly 33, and the second lead screw assembly 35 can move the probing unit 50 precisely towards surfaces of the object 70.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A coordinate measuring apparatus comprising:
   a base body;
   a delivery unit located on the base body, the delivery unit comprising a power assembly, a first lead screw assembly, and a second lead screw assembly, the first lead screw assembly being connected to the power assembly, the second lead screw assembly being connected to the first lead screw assembly; and
   a probing unit being connected to the second lead screw assembly;
   wherein the power assembly is configured for driving the first lead screw assembly to move along a first direction, the first lead screw assembly is configured for driving the second lead screw assembly to move along a second direction, the second lead screw assembly is configured for driving the probing unit to move along a third direction.

2. The coordinate measuring apparatus as claimed in claim 1, wherein the second direction is perpendicular to the first direction, and the third directions perpendicular to the first direction and the second direction; the power assembly comprises an electric motor, a threaded rod, and a support block for supporting the threaded rod, a first end of the threaded rod is connected to the electric motor, and a second end of the threaded rod passes through a through hole defined on the support block.

3. The coordinate measuring apparatus as claimed in claim 2, wherein the power assembly further comprises two sliding rails, two sliding members and two support members; each sliding member is slidably located on one sliding rail, each support member is connected to one sliding member.

4. The coordinate measuring apparatus as claimed in claim 3, wherein the electric motor, the threaded rod, the support block are located between the two sliding rails.

5. The coordinate measuring apparatus as claimed in claim 3, wherein the power assembly further comprises a sliding block and a connecting plate; the threaded rod is received through the sliding block, and the sliding block is fixed on the connecting plate; two opposite ends of the connecting plate are respectively connected to the two sliding members.

6. The coordinate measuring apparatus as claimed in claim 3, wherein the two support members support the first lead screw assembly.

7. The coordinate measuring apparatus as claimed in claim 6, wherein the first lead screw assembly comprises a first main body supported by the two support members and a first connecting block; the second lead screw assembly comprises a second connecting block, the second connecting block is connected to the first connecting block.

8. The coordinate measuring apparatus as claimed in claim 7, wherein the first lead screw assembly further comprises a first motor, a first lead screw, a first sliding member, and two opposite first rails; the first motor is located on the first main body and the first lead screw is connected to the first motor; the first lead screw is received through the first sliding member; the two first rails are located on a surface of the first main body; the first connecting block is fixed on the first sliding member and is slidably connected to the two first rails.

9. The coordinate measuring apparatus as claimed in claim 8, wherein the second lead screw assembly further comprises a second main body, a second motor, a second lead screw, a second sliding member, two opposite second rails, and a third connecting block; the second main body is connected to the first connecting block by the second connecting block; the second motor is located on the second main body and is connected to the second lead screw; the second lead screw is received through the second sliding member; the two second rails are located on a surface of the second main body; the third connecting block is slidably connected to the two first rails.

10. The coordinate measuring apparatus as claimed in claim 9, wherein the probing unit comprises a connecting portion and a probe; one end of the connecting portion is connected to the third connecting block, and the other end of the connecting portion is connected to the probe.

11. A coordinate measuring apparatus comprising:
a base body;
a delivery unit located on the base body, the delivery unit comprising a power assembly, a first lead screw assembly, and a second lead screw assembly, the first lead screw assembly being connected to the power assembly, the second lead screw assembly being slidably connected to the first lead screw assembly; and
a probing unit being slidably connected to the second lead screw assembly;
wherein an object is located on the base body, the power assembly drives the first lead screw assembly to move along the base body, the power assembly, the first lead screw assembly, and the second lead screw assembly works together to move the probe unit in three dimensions to measure the object.

12. The coordinate measuring apparatus as claimed in claim 11, wherein the power assembly comprises an electric motor, a threaded rod, and a support block for supporting the threaded rod, a first end of the threaded rod is connected to the electric motor, and a second end of the threaded rod passes through a through hole defined on the support block.

13. The coordinate measuring apparatus as claimed in claim 12, wherein the power assembly further comprises two sliding rails, two sliding members and two support members; each sliding member is slidably located on one sliding rail, each support member is connected to one sliding member.

14. The coordinate measuring apparatus as claimed in claim 13, wherein the electric motor, the threaded rod, the support block are located between the two sliding rails.

15. The coordinate measuring apparatus as claimed in claim 13, wherein the power assembly further comprises a sliding block and a connecting plate; the threaded rod is received through the sliding block, and the sliding block is fixed on the connecting plate; two opposite ends of the connecting plate are respectively connected to the two sliding members.

16. The coordinate measuring apparatus as claimed in claim 13, wherein the two support members support the first lead screw assembly.

17. The coordinate measuring apparatus as claimed in claim 16, wherein the first lead screw assembly comprises a first main body supported by the two support members and a first connecting block; the second lead screw assembly comprises a second connecting block, the second connecting block is connected to the first connecting block.

18. The coordinate measuring apparatus as claimed in claim 17, wherein the first lead screw assembly further comprises a first motor, a first lead screw, a first sliding member, and two opposite first rails; the first motor is located on the first main body and the first lead screw is connected to the first motor; the first lead screw is received through the first sliding member; the two first rails are located on a surface of the first main body; the first connecting block is fixed on the first sliding member and is slidably connected to the two first rails.

19. The coordinate measuring apparatus as claimed in claim 18, wherein the second lead screw assembly further comprises a second main body, a second motor, a second lead screw, a second sliding member, two opposite second rails, and a third connecting block; the second main body is connected to the first connecting block by the second connecting block; the second motor is located on the second main body and is connected to the second lead screw; the second lead screw is received through the second sliding member; the two second rails are located on a surface of the second main body; the third connecting block is slidably connected to the two first rails.

20. The coordinate measuring apparatus as claimed in claim 19, wherein the probing unit comprises a connecting portion and a probe; one end of the connecting portion is connected to the third connecting block, and the other end of the connecting portion is connected to the probe.

* * * * *